(No Model.)
H. SARGENT.
ELECTRIC HOSE COUPLING.
No. 499,254. Patented June 13, 1893.
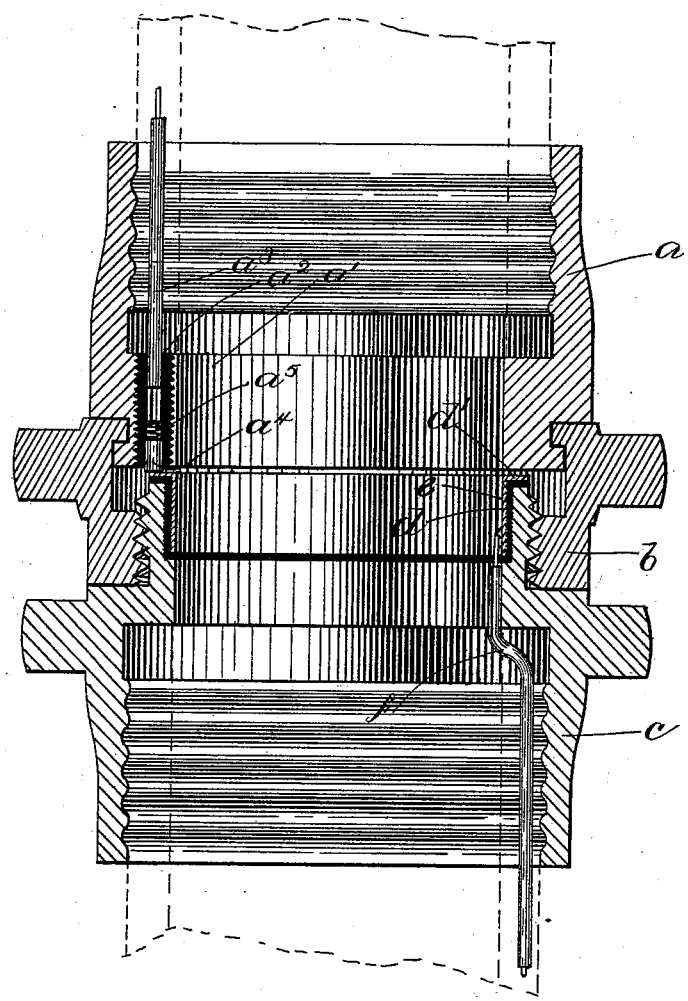
WITNESSES
Charles B. Crocker
Jonas R. Foster
INVENTOR
Heorard Sargent
by B J Noyes
Atty.

UNITED STATES PATENT OFFICE.

HOWARD SARGENT, OF CAMBRIDGE, MASSACHUSETTS.

ELECTRIC HOSE-COUPLING.

SPECIFICATION forming part of Letters Patent No. 499,254, dated June 13, 1893.

Application filed February 21, 1893. Serial No. 463,255. (No model.)

*To all whom it may concern:*

Be it known that I, HOWARD SARGENT, of Cambridge, county of Middlesex, State of Massachusetts, have invented an Improvement in Electric Hose-Couplings, of which the following description, in connection with the accompanying drawing, is a specification, like letters on the drawing representing like parts.

This invention has for its object to improve the construction of electric hose or pipe couplings, whereby more effectual electric connection may be made without diminishing the area of the water way.

My invention consists in details of construction to be hereinafter more particularly pointed out.

The drawing shows in vertical section a full sized hose or pipe coupling provided with electric connections in accordance with this invention.

The half or portion $a$, having the internally screw threaded ring $b$ secured to it, and the half or portion $c$ externally screw threaded to be turned in said ring $b$, are all of any usual or suitable construction. Through the shoulder $a'$, of the half $a$ against which the end of the hose abuts, an internally screw threaded hole is formed which receives a threaded plug $a^2$, of insulating material. The plug $a^2$, has a hole through it of small diameter for a portion of the distance which receives the covered wire $a^3$, and of larger diameter for the remaining distance which receives a metallic cap $a^4$, which is connected with the wire by a spring $a^5$. Thus the metallic cap is free to yield, yet a metallic connection is made with the wire. The metallic cap is designed to project below the abutting face of the shoulder $a'$.

The adjacent screw threaded end of the other half or portion $c$ is reamed out for a short distance, and preferably internally screw threaded to receive a thin threaded ring $d$ of insulating material, which ring has an outwardly extended flange $d'$, which bears upon or against the end of the half or portion $c$, and the inner surface of said ring $d$ is likewise preferably screw threaded to receive a threaded metallic ring $e$ likewise having an outwardly extended flange which bears upon or against the flanged end of the ring $d$. Thus the metallic ring $d$ is completely insulated from the half or portion $c$. The electric wire $f$, passes through the half portion $c$ and its bared end is rigidly connected to said metallic ring $e$. The rings $d$ and $e$, are made so thin that when secured in position in the reamed out portion or half $c$, the water way is not diminished. Also it will be seen that by connecting the wire $a^3$, to the half or portion $a$, in the manner shown, the water way through said half or portion $a$ is not diminished, thereby overcoming the most serious objection to electric hose couplings used in connection with hose signaling apparatus.

It is obvious that the metallic ring $e$ may be secured to the half or portion $c$ in a different manner, and insulated therefrom, so I do not desire to limit my invention to connecting said parts by providing them with screw threads as shown. Furthermore it will be seen that when the halves or portions are screwed together, the metallic cap or plug $a^4$ will bear upon the flange of the metallic ring, rubbing along as the part $c$ is turned, so that a rubbing contact is insured, and as the electric contact upon one part is yielding and upon the other is made circular, it is not necessary that the parts should always occupy the same relative position to insure electrical connection.

I claim—

In an electric hose or pipe coupling, the combination of the half $a$, with shoulder $a'$, having a hole through it, the plug $a^2$, of insulating material contained in said hole, also having a hole through it, electric wire $a^3$, metallic cap $a^4$, and spring $a^5$, connecting said cap with the wire, and all contained in the hole in the plug $a^2$, the half $c$ reamed out at the end, the flanged ring $d$ of insulating material, and the metallic flanged ring $e$ secured to the ring $d$ and wire $f$ secured to said metallic ring, substantially as described.

In testimony whereof I have signed my name to this specification in the presence of two subscribing witnesses.

HOWARD SARGENT.

Witnesses:
BERNICE J. NOYES,
CHARLES B. CROCKER.